United States Patent [19]

Farina

[11] Patent Number: 4,650,622

[45] Date of Patent: * Mar. 17, 1987

[54] METHOD OF SURFACE HARDENING A CERAMIC ARTICLE OF MANUFACTURE

[75] Inventor: Alfred J. Farina, Baldwin, N.Y.

[73] Assignee: Thermocatalytic Corporation, Williston Park, N.Y.

[*] Notice: The portion of the term of this patent subsequent to May 3, 2000 has been disclaimed.

[21] Appl. No.: 606,881

[22] Filed: May 3, 1984

[51] Int. Cl.$^4$ .............................................. B28B 1/26
[52] U.S. Cl. ...................................... 264/64; 162/152; 162/181.4; 162/181.6; 162/183; 162/228; 264/56; 264/87; 264/120; 264/125; 502/527
[58] Field of Search ...................... 264/56, 87, 125, 43, 264/64, 120; 162/152, 181.4, 181.6, 183, 228; 502/527

[56] References Cited

U.S. PATENT DOCUMENTS

| | | | |
|---|---|---|---|
| 3,275,497 | 9/1966 | Weiss et al. | 264/63 X |
| 4,182,951 | 1/1980 | Kruder | 219/160 |
| 4,381,970 | 5/1983 | Craig et al. | 162/152 |

*Primary Examiner*—Jan Silbaugh
*Assistant Examiner*—Mary Lynn Fertig
*Attorney, Agent, or Firm*—Bauer & Amer

[57] ABSTRACT

The ceramic article, after molding and while in a porous condition, is surface hardened not by being placed in a kiln and exposed to high temperatures, but is operatively arranged to have a combustible gas-air mixture pumped under appropriate pressure through the porosity of its molded shape. The exiting gas-air mixture is, according to the present invention, ignited, and this causes the exterior surface of the molded shape to incandesce, with the result that the external surface hardens without causing internal stresses within the article, and also avoids causing differential thermal expansion between the exterior surface and the fiber substance of the article adjacent thereto.

4 Claims, No Drawings

METHOD OF SURFACE HARDENING A CERAMIC ARTICLE OF MANUFACTURE

The within invention is an improved method of surface hardening a ceramic article of manufacture that is characterized by the fact that a kiln, which now is conventionally used to harden or complete the manufacture of such article, is totally eliminated. Instead, the article is molded in any selected desired shape and also has as one of its attributes, that it is porous in nature, such that a combustible gas-air mixture is then able to be pumped under appropriate pressure through the porosity of the molded shape. The exiting gas-air mixture is, according to the present invention, ignited, and this causes the exterior surface of the molded shape to incandesce, with the result that the external surface hardens without causing internal stresses within the article, and also avoids causing differential thermal expansion between the exterior surface and the fiber substance of the article adjacent thereto.

Stated another way, in the prior art process which uses a kiln to complete the manufacture of a ceramic article of manufacture, the baking temperature is typically in excess of 1100 deg. F. and is applied throughout the entire fibrous body of the article, and at such temperature, the alumina fibers, of which the article is constituted, undergo a phase transformation from gamma or theta phase or a combination thereof to the alpha phase. However, and as is well known, as the alumina transforms from gamma to theta and then to alpha, there is a tendency for the alumina fibers to densify, and thus for the exterior surface of the ceramic article to become undesirably brittle, and for internal stress to develop below said brittle surface.

The ceramic article that is advantageously cured by the within inventive method need not be constituted of pure alumina fibers which undergo the phase changes as just described, but may be constituted of other alumina-related fibers and nevertheless benefit from the within inventive surface-hardening process. For example, the fibers of the ceramic article may be KAOWOOL or CERACHROME which, when heated above 200–270 deg. F. begin slightly to form mullite and crystobilite and in the range between 1700–2700 deg. F. eventually form 70% mullite (alumina) and 30% crystobilite (silica). As a result there is a crystal growth and volume increase of approximately 5% which makes the fibers brittle, and thus introduces the same shortcoming as occurs with pure alumina fibers that are exposed to a high temperature.

In sharp contrast, the present invention which contemplates curing the ceramic article by incandescing its exterior surface, thus avoids the application of a high temperature throughout the body of the ceramic article, since incandescing, as is well understood, is only an exterior surface combustion reaction, and this therefore allows the innermost fibers below the exterior surface to retain their initial unfired desirable properties.

FIBER PREPARATION

To achieve porosity in the ceramic article, so that the gas-air mixture can be pumped therethrough, requires appropriate fiber preparation, which is well known to those versed in the art, and is exemplified by the description of the fiber preparation in U.S. Pat. No. 4,381,970, which patent by this reference, is incorporated herein in its entirety.

Thus, the selected ceramic article, which could be a flameless reactor as described and illustrated in U.S. Pat. No. 3,275,497, or a weld back-up assembly as described and illustrated in U.S. Pat. 4,182,951, is, according to the present invention, initially molded as a porous body consisting primarily of alumina and silica fibers. To achieve this, the ceramic article is formed by preparing a liquid vehicle including an alumina dispersion, magnesium sulfate, colloidal silica, water, powdered talc and preferably tributyl sulfate as an anti-foam agent. The vehicle is then admixed preferrably with a composition of alumina and silica fibers to form a slurry which is vacuum molded around a porous mandrel to form the specific ceramic article that is desired. For a flameless reactor of the type illustrated and described in U.S. Pat. No. 3,275,497, the screen mandrel would be cylindrical, whereas for a weld back-up assembly of the type illustrated and described in U.S. Pat. No. 4,182,951, it would be rectangular. In other words, the size and shape of the screen mandrel is dictated by these parameters in the resulting ceramic article and are not critical in being able to surface harden the ceramic article by causing the external surface thereof to incandesce, as proposed according to the present invention. The alumina dispersion is initially prepared by admixing dispersable alumina with water and an acid. A preferred dispersable alumina is marketed by Remet Corporation of Chadwicks, N.Y. under the trade designation "DISPURAL". A preferred acid is hydrochloric acid, most preferably a 37% concentration thereof.

In forming the alumina dispersion, water, in an amount between about 10% and about 30% by weight based on the weight of the entire liquid vehicle, is admixed with an amount of acid sufficient to obtain a desired pH in the resultant liquid vehicle. It is preferred that the pH of the vehicle be between about 4 and about 6, preferably about 5. For example, in order to prepare a vehicle with a pH within that range, it has been found necessary to add to the water a 37% concentration of hydrochloric acid in an amount between about 0.1% and about 0.2% by weight based on the weight of the entire vehicle. A particularly preferred amount of a 37% concentration of hydrochloric acid is between about 0.15% and 0.2% by weight.

To this water and acid mixture is then added the dispersible alumina in an amount up to about 5% by weight based on the weight of the entire vehicle and preferably in an amount between about 1% and 5% by weight. A particularly preferred amount of dispersible alumina is about 2% which is an amount sufficient to make a 10% dispersion of alumina.

The alumina dispersion is then substantially diluted by the addition of water in an amount between about 40% and about 80% based on the weight of the entire vehicle. Preferably, the alumina dispersion is diluted in water in an amount between 60% and 70% by weight.

After dilution of the alumina dispersion, magnesium sulfate, in an amount up to about 4% by weight based on the weight of the entire vehicle, is added. A preferred amount of magnesium sulfate is between about 1% and about 2% by weight and a most preferred amount is between about 1% and about 1.5% by weight.

The mixture is then stabilized for a period of time, preferably overnight, at which time it becomes thixotropic.

After stabilization, colloidal silica in an amount up to about 10% by weight based on the weight of the entire vehicle is added to the mixture followed by vigorous mixing. A preferred colloidal silica is marketed by E. I. DuPont de Nemours of Wilmington, Del. under the trade designation "LUDOX AG". Preferably, the colloidal silica is added in an amount between about 5% and about 8% by weight and, most preferably in an amount between about 6% and about 7% by weight.

Powdered talc, in an amount sufficient to cause the solid fiber portion to adhere together is then added to the mixture. Preferably powdered talc in an amount between about 0.0001% and about 0.1% calculated by weight based on the weight of the entire vehicle is added. A particularly preferred amount of powdered talc is between about 0.0001% and about 0.0002%. It has been found that the addition of the powdered talc in the aforementioned amount permits formation of the reactor cylinder without the addition of the methyl methacrylate filler or binder heretofore required. Moreover, by the elimination of the fillet or binder, it thus becomes unnecessary to sublime or decompose the filler or binder at elevated temperatures resulting in a phase transformation of the alumina.

After introduction of the powdered talc and after vigorous mixing, the liquid vehicle may contain an undesirable amount of entrapped air. It may therefore be desirable to deaerate the vehicle by the addition of an antifoam agent such as, for example, tributyl phosphate in an amount sufficient to eliminate the entrapped air, generally in an amount up to about 5 cc per gallon of liquid vehicle. A preferred amount of the antifoam agent is about 2 cc per gallon. After addition of the antifoam agent, the vehicle is further mixed until elimination of the remaining bubbles. The vehicle, which is then ready to receive the solid alumina and silica fibers, should have a pH of between about 4 and about 6, preferably about 5, and a specific gravity in excess of about 1.00.

The solid fiber portion consists of a mixture of alumina and silica fibers containing about 2% chromium oxide. A preferred source of the alumina and silica fibers is a commercially available product marketed by the Johns Manville Corporation under the trade designation "CERACHROME."

The solid fiber portion is added to the liquid vehicle and blended. The mixture is then blended and chopped for a period of time followed by the addition of additional liquid vehicle to bring the total quantity of the resultant slurry to about one gallon. A preferred ratio in grams of solid fiber to gallons of liquid vehicle is between about 8:1 and about 60:1 and preferably about 50:1.

VACUUM MOLDING

The specific ceramic article is formed from the above prepared slurry in a manner similar to the vacuum molding process described in U.S. Pat. No. 3,275,497. A vacuum tank and vacuum pump are required. A preferred vacuum pump is the Gast, Model 1022-103-G272X or an equivalent and a preferred vacuum tank is a 10 gallon, stainless steel model equipped with a vacuum gauge indicating 0–30 inches of mercury, a sight tube to show the liquid level, a vacuum breaker valve, and a drain valve. Also required are a slurry molding tank, preferably having a capacity of at least seven gallons, two lengths of a vacuum hose, and a screen armature of an appropriate shape and size around which the ceramic article is molded. The porous molding mandrel is preferably closed at one end and fitted with a gas/air feed tube at the other end. The screen is preferably formed around a 0.625" diameter mandrel and is preferably stainless steel wire mesh 0.06", 20×20. The gas/air feed tube is preferably 0.625 inch O.D. stainless steel.

To effect the vacuum molding process, one of the hoses is used to connect the outlet of the vacuum tank to the inlet of the vacuum pump and the other hose is used to connect the inlet of the vacuum tank to the gas/air feed tube at the end of the screen armature.

Approximately five gallons of the slurry are poured into the slurry molding tank. After starting the vacuum pump, the screen armature is introduced into the tank in approximately a vertical position and to within about two inches of the bottom of the tank. The screen armature is maintained in position in the tank until the vacuum gauge reaches 24 inches of mercury at which time it is withdrawn while a vacuum is maintained. In this manner, the slurry is formed around the screen armature thus creating the molded ceramic article, which as already noted, could be a flameless reactor, a weld back-up assembly, or some other article of manufacture that is advantageously manufactured of ceramic construction material.

The vacuum pump is maintained in operation until the vacuum gauge falls to about four inches of mercury whereupon it is shut off and the ceramic article is disconnected from the vacuum hose. The ceramic article is then stored and the drain valve opened and the depleted slurry drained.

While the ceramic article is still wet and relatively soft, its surface is advantageously divided into small areas for the purpose of interrupting thermal strain lines during subsequent incandescing treatment which may result in flaking of the surface. This may be accomplished, for example, by pressing a form into the ceramic article surface. It may also be accomplished by placing the gas/air feed tube which is inserted by any appropriate manner into the ceramic article in the chuck of a lathe and winding an ordinary sewing thread onto it in a continuous spiral having a pitch of about 0.125 inches and tensioned to make an indentation of about 0.030 inches. The free end of the thread may be secured by conventional means, i.e., tying or tape, and the ceramic article is then removed from the lathe. The thread will burn off during initial ignition with its pattern remaining permanently impressed in the surface of the ceramic article.

THE SURFACE HARDENING

The molded ceramic article, preferably while still supported on the porous mandrel, and itself having a fibrous structure which is porous, is then operatively connected to an aspirator which, when turned on, will be understood to cause the admission of a fuel gas/air mixture, such as 10 volumetric parts air to 1 part of methane or hydrocarbon gases, into the interior of the mandrel. The mixture then flows through the porous fibrous construction which forms a wall of a selected thickness of the ceramic article.

Thus, the ceramic article wall serves as a refractory wall comprising discrete, amorphous, inorganic fibers arranged in a homogenous, porous wall structure having opposed inner and outer surfaces, the fibers being intermeshed between these surfaces and supported on the mandrel. The porosity and thermal conductivity of the described wall is such, in conjunction with the appropriate rate selected for the flow of gas/air mixture therethrough, to produce in the fibers on the outer surface layer of the wall an incandescence and combustion reaction which is flameless, but nevertheless complete.

An important contribution of the present invention is the recognition that the surface incandescence of the ceramic article, as above described, provides a surface hardening to the ceramic article that is a significant improvement over that which conventionally is provided by curing the ceramic article in a kiln. More particularly, a ceramic article curing by incandescence, rather than in a kiln, has an exterior wall surface which has been rendered mechanically and thermally stable, while the fibers below this exterior surface retain their initial unfired desirable properties of being essentially devoid of brittleness, stress, and/or experiencing excessive growth in size or volume which contributes to brittleness and stress.

The ceramic article, heat treated by the incandescing process as just described, is then removed from the mandrel and if used as a flameless reactor of U.S. Pat. No. 3,275,497, for example, or as a weld back-up assembly of U.S. Pat. No. 4,182,951, or in any of the varied other end-uses that are appropriate for a ceramic construction material, has been found to be less vulnerable during normal use to breakage and/or cracking that heretofore would result in ceramic articles cured in a kiln.

A latitude of modification, change and substitution is intended in the foregoing disclosure and in some instances some steps of the inventive method will be employed without a corresponding use of other steps. Accordingly, it is appropriate that the appended claims be construed broadly and in a manner consistent with the spirit and scope of the invention herein.

What is claimed is:

1. A process of surface hardening a ceramic article of manufacture of the type comprised primarily of refractory fibers, said process consisting of the steps of producing a porous molded shape of said refractory fibers, attaching to said molded shape a source of a combustible gas/air mixture and flowing said gas/air mixture through the porosity of said molded shape, and igniting said gas/air mixture at the surface of said molded shape to thereby cause an incandescense in said surface produced by the combustion of said ignited gas/air mixture, whereby said incandensing surface hardens without stress and differential expansion relative to the internal fiber content of said molded shape, as normally occurs during conventional kiln-hardening thereof.

2. A process of surface hardening a ceramic article of manufacture of the type comprised primarily of alumina and silica fibers, said process consisting of the steps of producing a porous molded shape of said alumina and silica fibers, attaching to said molded shape a source of a combustible gas/air mixture and flowing said gas/air mixture through the porosity of said molded shape, and igniting said gas/air mixture at the surface of said molded shape to thereby cause an incandescence in said surface produced by the combustion of said ignited gas/air mixture, whereby said incandescing surface hardens without stress and differential expansion relative to the internal fiber content of said molded shape, as normally occurs during conventional kiln-hardening thereof.

3. The process of surface hardening a ceramic article of manufacture as claimed in claim 2, wherein said molded shape is produced from a slurry of said alumina and silica fibers.

4. The process of surface hardening a ceramic article of manufacture as claimed in claim 3, wherein said slurry of alumina and silica fibers is deposited onto a screen support using a vacuum, and said deposit of fibers is hardened by said incandescing of its external surface using said gas/air mixture.

* * * * *